US005739267A

United States Patent [19]
Fujisawa et al.

[11] Patent Number: 5,739,267
[45] Date of Patent: Apr. 14, 1998

[54] PROCESS FOR ISOLATION OF ISOBUTYLENE POLYMER

[75] Inventors: Hiroshi Fujisawa; Yoshikuni Deguchi, both of Kobe; Kouji Noda, Yokohama; Masakazu Isurugi, Kyoto; Masanobu Tamura; Junichi Hazama, both of Kobe; Tsutomu Ikeda; Shun Wachi, both of Takasago, all of Japan

[73] Assignee: Kanegafuchi Kagaku Kogyo Kabushiki Kaisha, Osaka, Japan

[21] Appl. No.: 704,607

[22] PCT Filed: Mar. 17, 1995

[86] PCT No.: PCT/JP95/00486

§ 371 Date: Sep. 16, 1996

§ 102(e) Date: Sep. 16, 1996

[87] PCT Pub. No.: WO95/25754

PCT Pub. Date: Sep. 28, 1995

[30] Foreign Application Priority Data

Mar. 18, 1994 [JP] Japan .................................. 6-072883
Jul. 8, 1994 [JP] Japan .................................. 6-179668
Jul. 8, 1994 [JP] Japan .................................. 6-179669

[51] Int. Cl.$^6$ .............................. C08F 6/08; C08F 10/10
[52] U.S. Cl. .......................... 528/485; 528/482; 528/488; 528/489; 526/90; 526/135; 526/145; 526/146; 526/147; 526/237; 526/348.7; 525/333.7; 525/360; 525/361; 525/366; 525/369; 525/370
[58] Field of Search .................... 525/333.7, 360, 525/361, 366, 369, 370; 528/482, 488, 489, 485; 526/237, 145, 146, 147, 90, 135, 348.7

[56] References Cited

U.S. PATENT DOCUMENTS

| | | | |
|---|---|---|---|
| 2,786,828 | 3/1957 | Schneider et al. | 526/348.7 X |
| 2,893,981 | 7/1959 | Ernst et al. | 526/348.7 X |
| 4,342,849 | 8/1982 | Kennedy | 525/333.7 |
| 4,587,307 | 5/1986 | Bronstert et al. | 525/333.7 X |

*Primary Examiner*—Fred Teskin
*Attorney, Agent, or Firm*—Armstrong,Westerman,Hattori,McLeland & Naughton

[57] ABSTRACT

Processes for the isolation of a telechelic isobutylene polymer in a non-aqueous system to prevent the generation of waste water having a solvent dissolved therein and processes for the preparation of a telechelic isobutylene polymer having more advantageous unsaturated groups. A process for the isolation of an isobutylene polymer includes a cationic polymerization reaction in a non-aqueous system in the presence of a catalyst $MX_n$ wherein M represents a metallic atom and X may be the same or different and represents a halogen atom or a monovalent hydrocarbon group. The process comprises conducting the cationic polymerization reaction, conducting a ligand exchange reaction of said catalyst, and then removing a component containing M. Another process for the isolation includes a cationic polymerization in a non-aqueous system in the presence of the catalyst, the process comprises producing a telechelic isobutylene polymer and at the same time removing the catalyst with an adsorption material capable of adsorbing an acid. Another process for the isolation comprises conducting a cationic polymerization reaction in a non-aqueous system in the presence of the catalyst; adding a compound represented by the general formula $Q(OR)_m$ where Q is a metallic atom and R is hydrogen or a monovalent organic group to effect the dehydrochlorination reaction at the ends of the polymer and the ligand exchange reaction of the catalyst so as to produce a telechelic isobutylene polymer having an unsaturated group; and removing a component containing M.

12 Claims, No Drawings

PROCESS FOR ISOLATION OF ISOBUTYLENE POLYMER

[TECHNICAL FIELD]

The present invention relates to a process for the isolation of an isobutylene polymer after the polymerization reaction and a process for the efficient production of an isobutylene polymer having telechelic unsaturated groups.

[BACKGROUND ART]

Among telechelic polymers, i.e., polymers having functional groups at a plurality of ends, polymers having vinyl groups at both ends are useful as starting materials for photo-setting resins, ultraviolet-curing resins, electron radiation-curing resins, sealing compounds for electronics, adhesives, modifiers, coating materials, sealing compounds for building, etc.

It is known that a functional group-terminated polymer, e.g., isobutylene polymer having at both ends a chlorine atom connected to tertiary carbon is produced by the inifer method which comprises the cationic polymerization of isobutylene in the presence of 1,4-bis(α-chloroisopropyl) benzene [hereinafter simply referred to as "p-DCC"] as an initiator/chain transfer agent and boron trichloride as a catalyst (U.S. Pat. No. 4,276,394).

Further, many reports have been made by Kennedy et al. that, when the foregoing cationic polymerization reaction is carried out in a solvent containing a halogenated hydrocarbon having one or two carbon atoms (e.g., methyl chloride, methylene chloride) in the presence of an electron donor, an isobutylene polymer having a small Mw/Mn value as determined by GPC, i.e., uniform molecular weight, can be obtained [*J. Macromol. Sci.-Chem.*, A18 (1), 25 (1982), *Polym. Bull.*, 20, 413 (1988), *Polym. Bull.*, 26, 305 (1991), JP-A-1-318014 (The term "JP-A" as used herein means an "unexamined published Japanese patent application") corresponding to U.S. Pat. No. 5,169,914].

In these reactions, a Lewis acid such as $BCl_3$, $TiCl_4$ and $AlCl_3$ is used as a polymerization catalyst. The cationic polymerization reaction can be terminated by adding water to the reaction system so that ligands are exchanged between the Lewis acid and water, and the Lewis acid is dissolved in water. Thus, the Lewis acid can be separated from the polymer solution by separating the water from the reaction system.

However, this process is disadvantageous in that the separation of the aqueous phase from the organic phase are difficult under certain production conditions. Accordingly, a large amount of water and metal salts are mixed in the organic phase, thus reducing the purity of the product. Further, a halogen-based organic solvent such as methylene chloride is dissolved in the aqueous solution, requiring an extremely elaborate apparatus for the disposal of waste water. With respect to $BCl_3$ having a low boiling point (12.5° C.), removal by distillation has reported [JP-A-4-20511, specification]. However, since $BCl_3$ is extremely expensive among Lewis acids, it is impracticable as an industrial material. The inventors' object is to provide a process for separating a catalyst from a polymer without generating waste water in the cationic polymerization of isobutylene or the like in the presence of a practical Lewis acid.

In the present invention, it is also made possible to effect a ligand exchange reaction of a catalyst represented by the foregoing general formula (I) as well as a dehydrochlorination reaction at ends. The inventors have made extensive studies and, as a result, it was made possible to provide a process for the preparation of a telechelic isobutylene polymer having an unsaturated group by a more effective dehydrochlorination reaction.

The term "telechelic polymer" as used herein means a polymer terminated by the same or different functional groups which can participate in crosslinking at a plurality of ends thereof.

[DISCLOSURE OF THE INVENTION]

The inventors made extensive studies to find out a process for the isolation/purification of an isobutylene polymer requiring no water-rinsing step.

The present invention has the following constitutions:

1. A process for the isolation of an isobutylene polymer which comprises the cationic polymerization reaction in a non-aqueous system in the presence of a catalyst represented by the following general formula (I):

$$MX_N \qquad (I)$$

wherein M represents a metallic atom; n represents an integer of from 2 to 6; and the plurality of X may be the same or different and each represent a halogen atom or a monovalent hydrocarbon group, characterized in that the process comprises carrying out polymerization, carrying out the ligand exchange reaction of said catalyst, and then removing a component containing M in the general formula (I).

2. The process for the isolation of an isobutylene polymer according to the foregoing paragraph 1, wherein said ligand exchange reaction is effected with the addition of a compound represented by the following general formula (II):

$$Q(OR)_m \qquad (II)$$

wherein Q represents a metallic atom belonging to the group $I_a$, $II_a$, $III_a$, $III_b$, $IV_a$ or $IV_b$ of the periodic table; m represents an integer of from 1 to 6; and R represents a hydrogen atom or a monovalent organic group, with the proviso that when m is 2 or more, the plurality of R may be the same or different, and simultaneously producing a telechelic isobutylene polymer.

3. A process for the isolation of an isobutylene polymer which comprises the cationic polymerization in a non-aqueous system in the presence of a catalyst represented by the foregoing general formula (I), characterized in that the process comprises producing a telechelic isobutylene polymer and simultaneously removing said catalyst with an adsorption material capable of adsorbing an acid.

4. A process for the isolation of an isobutylene polymer, which comprises carrying out cationic polymerization reaction in a non-aqueous system in the presence of a catalyst represented by the foregoing general formula (I); adding a compound represented by the foregoing general formula (II) to effect the dehydrochlorination reaction at the ends of the polymer and the ligand exchange reaction of the catalyst so as to produce a telechelic isobutylene polymer having an unsaturated group; and removing a component containing M in the general formula (I).

5. The process for the isolation of an isobutylene polymer according to the foregoing paragraph 2 or 4, wherein said compound represented by the general formula (II) comprises at least one compound or a plurality of compounds selected from the group consisting of NaOH, KOH, LiOH, $Ca(OH)_2$, $NaHCO_3$, $NaOCH_3$, $KOCH_3$, $LiOCH_3$, $Ca(OCH_3)_2$, $Mg(OCH_3)_2$, $Al(OCH_3)_3$, $Ti(OCH_3)_4$, $NaOCH_2CH_3$, $KOCH_2CH_3$, $LiOCH_2CH_3$, $Ca(OCH_2CH_3)_2$, Mg(OCH$_2$CH$_3$)$_2$, Al(OCH$_2$CH$_3$)$_3$, Ti(OCH$_2$CH$_3$)$_4$, NaOC(CH$_3$)$_3$, KOC(CH$_3$)$_3$, LiOC(CH$_3$)$_3$, NaOC(CH$_3$)$_2$CH$_2$CH$_3$, and Al[OCH(CH$_3$)$_2$]$_3$.

6. The process for the isolation of an isobutylene polymer according to the foregoing paragraph 4 or 5, wherein said dehydrochlorination at the ends of the polymer is effected under reduced pressure, i.e., not higher than 700 mmHg.

7. The process for the isolation of an isobutylene polymer according to any one of the foregoing paragraphs 1, 3, 5 and 6, wherein the following components (1) to (5) were mixed at a temperature of from −100° C. to 0° C. to prepare an isobutylene polymer:

(1) a cationically polymerizable monomer having isobutylene;

(2) a compound represented by the following general formula (III):

wherein R$^1$ represents an aromatic ring group or substituted or unsubstituted aliphatic hydrocarbon group; R$^2$ and R$^3$ may be the same or different and each represent a hydrogen atom or substituted or unsubstituted monovalent hydrocarbon group, with the proviso that when R$^1$ is an aliphatic hydrocarbon group, at least one of R$^2$ and R$^3$ is not a hydrogen atom; X represents a halogen atom, R$^4$COO— group (in which R$^4$ represents a hydrogen atom or a C$_{1-5}$ alkyl group) or R$^5$O— group (in which R$^5$ represents a hydrogen atom or a C$_{1-5}$ alkyl group); and w represents an integer of from 1 to 8;

(3) a catalyst represented by the foregoing general formula (I);

(4) an electron donor component having a donor number of from 15 to 50; and (5) a reaction solvent.

In general, when the ligand exchange reaction is effected in the presence of a compound represented by the foregoing general formula (II), a small amount of a compound represented by the general formula GOH [in which G represents a hydrogen atom or a monovalent hydrocarbon group] can be used as a catalyst. For example, CH$_3$OH, CH$_3$CH$_2$OH, (CH$_3$)$_2$CHOH, a slight amount of water, etc. may be used.

The term "non-aqueous system" as used herein does not necessarily mean a system which employs no water but means a system which generates no waste water. If necessary, an extremely small amount of water may be added to cause the ligand exchange reaction of the catalyst to proceed smoothly. In such a case, the water thus added is adsorbed by the adsorbing material capable of adsorbing an acid in the reaction solution, thus generating no waste water.

In the present invention, the isobutylene polymer normally has a number-average molecular weight (Mn) of from 500 to 300,000, preferably from 1,000 to 50,000. If Mn is less than 500, the excellent characteristics inherent to isobutylene polymer are lost. On the contrary, if Mn exceeds 300,000, the resulting polymer is solid, extremely deteriorating the workability thereof. The number-average molecular weight (Mn) and Mw/Mn value of the isobutylene polymer were determined by GPC using a polystyrene gel column [Shodex K-804, available from Showa Denko K. K.; mobile phase: chloroform] as a polystyrene-based value.

As the catalyst component represented by the foregoing general formula (I) for the present invention, any metallic complex known as Lewis acid may be used without any restriction. In general, TiCl$_4$, SnCl$_4$, AlCl$_3$, CH$_3$CH$_2$AlCl$_2$, (CH$_3$CH$_2$)$_2$AlCl, VCl$_5$, FeCl$_3$, BF$_3$, etc. may be used. However, the catalyst component is not limited to these compounds. Among these Lewis acids, TiCl$_4$, SnCl$_4$, and AlCl$_3$ are preferable.

In the present invention, the Lewis acid is normally used in an amount of from 0.1 to 100% by weight, preferably from 1 to 30% by weight based on the weight of the cationically polymerizable monomer having isobutylene. If the amount of the Lewis acid to be used as a catalyst component is less than 0.1% by weight, the yield of the cationic polymerization reaction decreases. On the contrary, if the amount of the Lewis acid to be used exceeds 100% by weight, no further merits can be obtained.

As the compound represented by the foregoing general formula (II) for the present invention, any compound containing a metallic atom belonging to the group I$_a$, II$_a$, III$_a$, III$_b$, IV$_a$ or IV$_b$ of the periodic table may be used without any restriction. In general, NaOH, KOH, LiOH, Ca(OH)$_2$, NaHCO$_3$, NaOCH$_3$, KOCH$_3$, LiOCH$_3$, Ca(OCH$_3$)$_2$, Mg(OCH$_3$)$_2$, Al (OCH$_3$)$_3$, Ti(OCH$_3$)$_4$, NaOCH$_2$CH$_3$, KOCH$_2$CH$_3$, LiOCH$_2$CH$_3$, C (OCH$_2$CH$_3$)$_2$, Mg(OCH$_2$CH$_3$)$_2$, Al(OCH$_2$CH$_3$)$_3$, Ti(OCH$_2$CH$_3$)$_4$, NaOC(CH$_3$)$_3$, KOC(CH$_3$)$_3$, LiOC(CH$_3$)$_3$, NaOC(CH$_3$)$_2$CH$_2$CH$_3$, Al[OCH(CH$_3$)$_2$]$_3$, etc. may be used. Among these compounds, NaOCH$_3$, KOCH$_3$, NaOH, KOH, and NaOCH$_2$CH$_3$ are preferable.

In the present invention, the compound represented by the general formula (II) is normally used in an amount of from 0.1 to 100 mol, preferably from 2 to 20 mol per 1 mol of the catalyst component represented by the foregoing general formula (I). If the amount of the compound represented by the general formula (II) to be used is less than 0.1 mol per mol of the catalyst component, the separation of the polymer from the catalyst is difficult. On the contrary, if the amount of the compound represented by the general formula (II) to be used exceeds 100 equivalents, no further merits can be obtained.

In the present invention, the ligand exchange reaction is normally effected under normal pressure or reduced pressure at a temperature of from −100° C. to 150° C. for 1 to 600 minutes. In the present invention, the removal of the Lewis acid catalyst after the ligand exchange can be accomplished by filtration, if the metallic complex derived from the catalyst is solid, or by distillation under reduced pressure, if the metallic complex derived from the catalyst is liquid. However, the present invention is not limited to these methods, and any methods are practicable.

In the present invention, as the adsorbing material capable of adsorbing an acid for use in the removal of the catalyst, compounds mainly composed of at least one of activated carbon, titanium oxide, Mg, Al and/or Si may be used. Examples of such a compound containing Si include aluminum silicate (silica alumina), molecular sieves (zeolite), silica gel, alumina gel, and activated clay.

Among these adsorbing materials, activated carbon and aluminum silicate are preferable.

In the present invention, the adsorbing material capable of adsorbing an acid is normally used in an amount of from 0.2 to 300 times, preferably from 3 to 100 times the weight of the compound represented by the foregoing general formula (I). The temperature at which adsorption is effected is normally from −100° C. to 40° C., preferably from −70° C. to 25° C. The reaction time is normally from 1 second to 10 hours.

In the present invention, the cationically polymerizable monomer containing isobutylene is not limited to a monomer made of isobutylene alone. The cationically polymerizable monomer containing isobutylene of the present invention contains a monomer copolymerizable with isobutylene, preferably in an amount of not more than 50% by weight (hereinafter simply referred to as "%").

Examples of the cationically polymerizable monomer copolymerizable with isobutylene include $C_{3-12}$ olefins, conjugated dienes, vinyl ethers, aromatic vinyl compounds, norbornenes, and vinyl silanes. Among these cationically polymerizable monomers, $C_{3-12}$ olefins and aromatic vinyl compounds are preferable.

Specific examples of the cationically polymerizable monomer copolymerizable with isobutylene usually include propene, 1-butene, 2-butene, 2-methyl-1-butene, 3-methyl-1-butene, pentene, hexene, cyclohexene, vinylcyclohexane, 5-ethylidenenorbornene, 5-propylidenenorbornene, butadiene, isoprene, cyclopentadiene, methyl vinyl ether, ethyl vinyl ether, isobutyl vinyl ether, vinyl carbazole, methoxystyrene, ethoxystyrene, t-butoxystyrene, hexenyloxy styrene, styrene, α-methylstyrene, methylstyrene, dimethylstyrene, chloromethylstyrene, chlorostyrene, indene, β-pinene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysitane, and γ-methacryloyloxypropylmethyldimethoxysilane.

Among these cationically polymerizable monomers, propene, 1-butene, 2-butene, cyclopentadiene, 5-ethylidene norbornene, isobutyl vinyl ether, methoxystyrene, and styrene and the like are preferable. One of these cationically polymerizable monomers copolymerizable with isobutylene may be used in combination with isobutylene, and two or more of these cationically polymerizable monomers may be used in combination.

In the present invention, the concentration of the cationically polymerizable monomer containing isobutylene in the batch process is normally from 0.1 to 10 mol/l, preferably from 0.5 to 6 mol/l.

Examples of the compound represented by the foregoing general formula (III) of the present invention include a compound represented by the following general formula (IV):

$$AY_n \qquad (IV)$$

wherein A represents a group having 1 to 4 aromatic rings, n represents an integer of from 1 to 8, and Y represents a group represented by the following general formula (V):

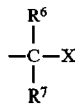

wherein $R^6$ and $R^7$ may be the same or different and each represent a hydrogen atom or a $C_{1-20}$ monovalent hydrocarbon group, and X represents a halogen atom, a $R^4COO$— group (in which $R^4$ represents a hydrogen atom or $C_{1-5}$ alkyl group) or a $R^5O$— group (in which $R^5$ represents a hydrogen atom or a $C_{1-5}$ alkyl group); a compound represented by the following general formula (VI):

$$BZ_m \qquad (VI)$$

wherein B represents a $C_{4-40}$ substituted or unsubstituted hydrocarbon group, Z represents a halogen atom connected to the tertiary carbon atom, a $R^8COO$— group (in which $R^8$ represents a hydrogen atom or a $C_{1-5}$ alkyl group) or a $R^9O$— group (in which $R^9$ represents a hydrogen atom or a $C_{1-5}$ alkyl group), and m represents an integer of from 1 to 4; and an oligomer having α-halostyrene units, but are not limited to these compounds. These compounds may be used alone or in combination of two or more.

In the compound represented by the general formula (IV), the group having 1 to 4 aromatic rings represented by A may be produced by condensation reaction or may not be a condensation product. Examples of the group containing aromatic rings include groups having a valence of from 1 to 6 which is derived from benzene, biphenyl, naphthalene, anthracene, phenanthrene, pyrene, Ph-$(CH_2)_l$-Ph (in which Ph represents a phenyl group, and l represents an integer of from 1 to 10). These groups having aromatic rings may be substituted by $C_{1-20}$ straight and/or branched aliphatic hydrocarbon groups or groups containing a functional group such as a hydroxyl group, an ether group and a vinyl group.

As the compound represented by the general formula (VI), compounds having a functional group other than Z, such as vinyl group and silyl group, may be used.

Examples of the oligomer having α-halostyrene units which can be used as the initiator/chain transfer agent include oligomer of α-chlorostyrene, and oligomer obtained by the copolymerization of α-chlorostyrene with a monomer copolymerizable with styrene.

In the present invention, it is advantageous to use, among the compounds represented by the general formula (III), a compound having two or more of halogen atoms, $R^4COO$— groups (in which $R^4$ represents a hydrogen atom or a $C_{1-5}$ alkyl group) or $R^5O$— groups (in which $R^5$ represents a hydrogen atom or a $C_{1-5}$ alkyl group) or a compound having a halogen atom, a $R^4COO$— group or a $R^5O$— group together with reactive functional groups as an initiator/chain transfer agent since the resulting polymer has a higher functionality.

Specific examples of the compound represented by the foregoing general formula (III) which can be normally employed include the following compounds:

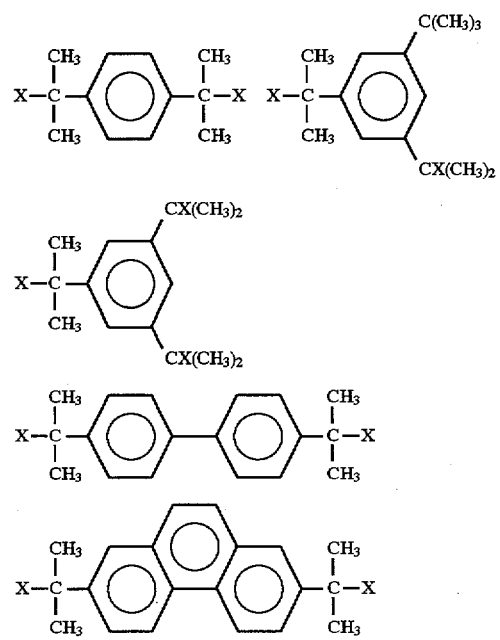

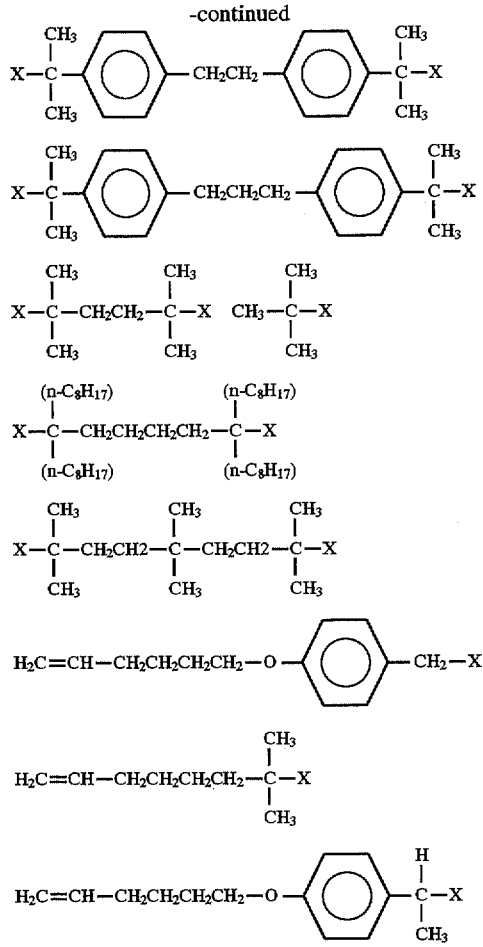

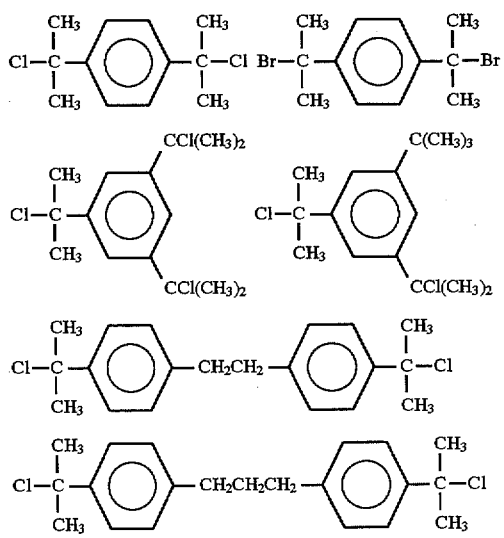

wherein X represents a halogen atom, a $R^4COO$— group (in which $R^4$ represents a hydrogen atom or a $C_{1-5}$ alkyl group) or a $R^5O$— group (in which $R^5$ represents a hydrogen atom or $C_{1-5}$ alkyl group), and oligomer of α-chlorostyrene, but are not limited to these compounds. Among these compounds, preferable ones are:

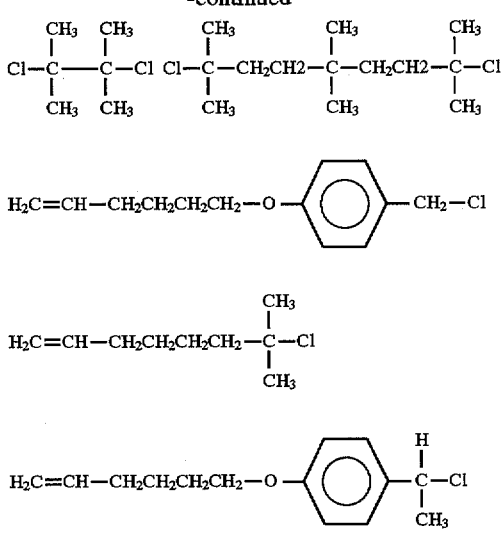

$CH_3COO$— group-containing compounds such as

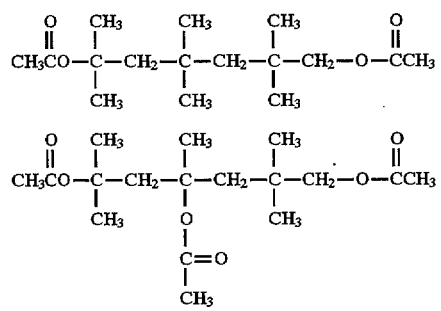

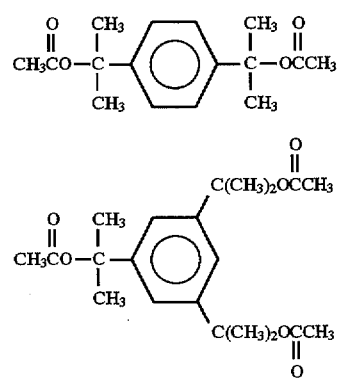

and $CH_3O$— group-containing compounds such as

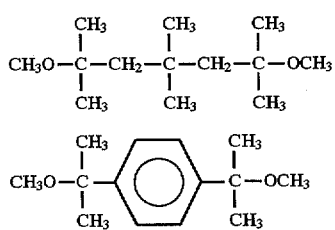

-continued

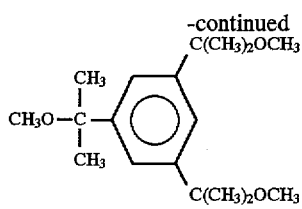

These compounds are components which are used as initiators/chain transfer agents. These compounds may be used alone or as a mixture of two or more in the present invention. By controlling the amount of these compounds to be used, the number-average molecular weight of the resulting isobutylene polymer can be arbitrarily predetermined.

In the present invention, the amount of the compound represented by the foregoing general formula (III) to be used is normally from 0.01 to 20% by weight, preferably from 0.1 to 10% by weight based on the weight of the cationically polymerizable monomer containing isobutylene.

As the electron donor component for the present invention, any known electron donor components having a donor number of from 15 to 50 may be used. Preferred examples of such electron donor components include pyridines, amines, amides, and sulfoxides, but are not limited to these compounds.

Specific examples of the electron donor component for the present invention include 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, diethylamine, N,N-dimethylaniline, N,N-dimethylformamide, N,N-dimethylacetamide, N,N-diethylacetamide, dimethylsulfoxide, diethyl ether, methyl acetate, ethyl acetate, trimethyl phosphate, and hexamethylphosphoric triamide. Among these electron donor components, 2,6-di-t-butylpyridine, 2,6-dimethylpyridine, 2-methylpyridine, pyridine, diethylamine, trimethylamine, triethylamine, N,N-dimethylformamide, N,N-dimethylacetamide, and dimethylsulfoxide are preferable. Picolines are further preferred. Among these electron donors, 2-methylpyridine is particularly preferred since a remarkable effect can be obtained even with its small donor number.

In the present invention, the electron donor component is normally used in an amount of from 0.01 to 10 mol, preferably from 0.1 to 2 mol per mol of the compound represented by the general formula (III).

As the reaction solvent for the present invention, halogenated hydrocarbons, aliphatic hydrocarbons, aromatic hydrocarbons or the like may be used. Examples of the halogenated hydrocarbon include methyl chloride, methylene chloride, 1,1-dichloroethane, 1,2-dichloroethane, 1-chloropropane, 1-chloro-2-methylpropane, 1-chlorobutane, 1-chloro-2-methylbutane, 1-chloropentane, 1-chlorohexane, and 1-chloro-2-methylhexane. Examples of the aliphatic or aromatic hydrocarbon include butane, pentane, neopentane, hexane, cyclohexane, methylcyclohexane, heptane, octane, benzene, toluene, and xylene.

Examples of the mixed solvent which can be used in the present invention include various combinations such as methylene chloride/hexane, 1,2-dichloroethane/hexane, 1-chloropropane/hexane, 1-chlorobutane/hexane and 1-chloropentane/hexane.

In the present invention, the polymerization reaction is not specifically limited and can be carried out by any conventional polymerization method. Among the foregoing components, i.e., (1) a cationically polymerizable monomer having isobutylene, (2) a compound represented by the general formula (III), (4) a Lewis acid, and (5) an electron donor component, a solution containing (4) a Lewis acid may be added to a solution containing a cationically polymerizable monomer containing isobutylene in a batch process. Alternatively, a solution containing (1) a cationically polymerizable monomer containing isobutylene may be continuously added to a solution containing (4) a Lewis acid in a semi-batch process. Further, a continuous process may be employed in which all the foregoing components are continuously charged into the reaction system while removing the reaction product.

In the present invention, if the ligand exchange reaction of the catalyst represented by the foregoing general formula (I) is accompanied by the dehydrochlorination reaction at the ends of the polymer, any compounds represented by the foregoing general formula (II) may be used without any restriction. Preferred examples of such a compound include NaOH, KOH, LiOH, Ca(OH)$_2$, NaHCO$_3$, NaOCH$_3$, KOCH$_3$, LiOCH$_3$, Ca(OCH$_3$)$_2$, NaOCH$_2$CH$_3$, KOCH$_2$CH$_3$, LiOCH$_2$CH$_3$, NaOC(CH$_3$)$_3$, KOC(CH$_3$)$_3$, LiOC(CH$_3$)$_3$, NaOC(CH$_3$)$_3$CH$_2$CH$_3$, and Al[OCH(CH$_3$)$_2$]$_3$.

In the present invention, if the ligand exchange reaction of the catalyst represented by the foregoing general formula (I) is accompanied by the dehydrochlorination reaction at the ends of the polymer, the dehydrochlorination reaction is preferably effected under reduced pressure. The dehydrochlorination reaction is normally effected under a pressure of not higher than 700 mmHg, preferably not higher than 20 mmHg, and more preferably not higher than 1 mmHg. A process for the preparation of an isobutylene polymer having telechelic unsaturated groups in the presence of NaOCH$_3$, KOC(CH$_3$)$_3$ or the like under normal pressure has already been known. However, the reaction under normal pressure is disadvantageous in that the reaction rate is actually low. In particular, it takes from 20 to 30 hours to complete the reaction at temperatures of not higher than 100° C. [see examples described in U.S. Pat. No. 4,316,973 and JP-A-1-261405]. Then, the inventors made extensive studies and, as a result, it was found that the dehydrochlorination reaction can be accelerated by reducing the pressure of the reaction system. The dehydrochlorination reaction at the ends of the polymer is considered to be an E2 reaction from the standpoint of reaction mechanism. Further, this elimination reaction is considered to be an irreversible reaction. Thus, it hardly can be considered in common sense that this reaction can be accelerated under reduced pressure. Accordingly, it can be said that an unexpected effect appeared. The reaction temperature at which the dehydrochlorination reaction occurs is normally from 30° C. to 300° C., preferably from 60° C. to 200° C. If possible, the reaction is preferably effected with stirring without solvent.

[BEST MODE FOR CARRYING OUT THE INVENTION]

The present invention will be further described in the following examples, but the present invention should not be construed as being limited thereto.

Structural analysis of isobutylene polymer

The structure of the isobutylene polymer obtained in the examples was determined by $^1$H-NMR spectrometry and GPC analysis. The measuring instruments used and the conditions for measurements will be given below.

$^1$H-NMR spectrometry (300 MHz): Gemini-300, available from Varian Corp. (measured in a mixture of heavy acetone and carbon tetrachloride)

GPC analysis: System: System available from Waters Corp. (Pump 600E, Differential Refractometer 401, etc.)

Column: Shodex-804 (polystyrene gel), available from Showa Denko K. K.

Mobile phase: chloroform (number-average molecular weight, etc. are determined as a polystyrene-based value)

EXAMPLE 1

The air in a 200 ml-capacity pressure-resistant glass vessel equipped with a magnetic stirrer and a three-way cock was replaced by nitrogen. Into the vessel were charged 59 ml of methylene chloride (which had been allowed to stand overnight or longer with molecular sieves 3A for drying), 37 ml of hexane (which had been allowed to stand overnight or longer with molecular sieves 3A for drying), and 0.139 g (0.6 mmol) of 1,4-bis(α-chloroisopropyl)benzene [p-DCC] through a syringe. Then, a pressure-resistant liquefied gas-collecting glass tube equipped with a needle valve in which 8 ml (96 mmol) of isobutylene monomer had been charged was connected to the three-way cock. The polymerization vessel was then dipped in a −70° C. dry ice/ethanol bath for cooling. The air was then evacuated from the vessel by a vacuum pump. The needle valve was then opened so that the isobutylene monomer was introduced from the liquefied gas-collecting tube into the polymerization vessel. Nitrogen gas was then introduced into the polymerization vessel from one of the three ways of the cock so that the pressure of the vessel was returned to normal value. A methylene chloride solution (1 ml containing 11.2 μl (0.12 mmol) of 2-methylpyridine was added into the polymerization vessel, and stirring of the monomer solution was then started at a temperature of −70° C.

A methylene chloride solution (3 ml) containing 0.33 ml (3 mmol) of titanium tetrachloride was then added to the polymerization solution through a syringe to initiate cationic polymerization reaction. The polymerization solution was allowed to undergo cationic polymerization reaction at a temperature of −70° C. for 60 minutes.

Thereafter, 5.8 g of a methanol solution of 1.62 g (30 mmol) of sodium methoxide (sodium methoxide content: 28%) was added to the polymerization solution at −70° C. The polymerization vessel was withdrawn from the dry ice/ethanol bath, and then dipped in a hot water bath so that the temperature of the polymer solution was raised to 40° C. The polymer solution was then moved into a 300 ml-capacity eggplant-type flask. The volatile content was then removed at a temperature of 100° C. under reduced pressure (not higher than 1 mmHg) by means of an evaporator in 2 hours. Hexane (200 ml) was then charged into the eggplant-type flask to dissolve the isobutylene polymer. The solution was then filtered through a Kiriyama funnel filter paper (No.4; retained particle: 1 μm) with suction. The volatile content was then evaporated to obtain 6.1 g of a colorless transparent isobutylene polymer. The properties of the polymer thus obtained are shown in Table 1.

Ti and Na, which are considered to be contaminating the polymer, were then determined. The results of the analysis are also shown in Table 1.

EXAMPLE 2

Into a 1l-capacity separable flask equipped with a mechanical stirrer and a three-way cock was charged 1.65 g (7.14 mmol) of p-DCC. The air in the vessel was then replaced by nitrogen, and 83 ml of methylene chloride (which had been allowed to stand overnight or longer with molecular sieves 3A for drying) and 174 ml of hexane (which had been allowed to stand with molecular sieves 3A overnight or longer for drying) were then added to the polymerization system through a syringe.

To the three-way cock was then connected a liquefied gas-collecting pressure-resistant glass tube equipped with a needle valve in which 85.5 ml of isobutylene monomer had been charged. The polymerization vessel was then dipped in a −75° C. dry ice/ethanol bath for cooling. The air was then evacuated from the vessel by a vacuum pump. The needle valve was then opened so that the isobutylene monomer was introduced from the liquefied gas-collecting tube into the polymerization vessel. Nitrogen gas was then introduced into the polymerization vessel from one of the three ways of the cock so that the pressure of the vessel was returned to normal value. A solution obtained by diluting 0.133 g (1.43 mmol) of α-picoline [2-methypyridine] with 1 ml of methylene chloride was then added into the polymerization vessel. The monomer solution was then stirred at a temperature of −75° C. by means of a mechanical stirrer.

A solution obtained by diluting 1.04 ml (9.52 mmol) of titanium tetrachloride with 12 ml of methylene chloride was then added into the polymerization vessel. The polymerization system was then allowed to undergo polymerization reaction at a temperature of −75° C. for 60 minutes. Thereafter, 8.5 ml (114 mmol) of methanol and 5.39 g (100.0 mmol) of sodium methoxide were added to the polyisobutylene (PIB) solution at −75° C., followed by stirring. The polymerization vessel was withdrawn from the dry ice/ethanol bath, and then dipped in a hot water bath so that the temperature of PIB solution was raised to about 40° C.

The vessel was then dipped in a 50° C. oil bath. The volatile content was evaporated under normal pressure and under reduced pressure while the temperature of the system was being gradually raised to 100° C. The mixture of PIB and a white powder which had remained in the vessel was then stirred for 60 minutes by means of the mechanical stirrer under reduced pressure (not higher than 1 mmHg, evacuated by a vacuum pump) while the system was being heated to a temperature of 100° C. Hexane (500 ml) was then added into the vessel to dissolve PIB. The solution was filtered through a Kiriyama filter paper to recover a solid content. Hexane was then evaporated to obtain 57.4 g of an isopropenyl-terminated PIB. The properties of the polymer thus obtained are shown in Table 1.

TABLE 1

|  | GPC | | % Proportion of isopropenyl group[1] at end | Elementary analysis (%) | |
| --- | --- | --- | --- | --- | --- |
|  | Mn | Mw/Mn |  | Ti[2] | Na[3] |
| Example 1 | 11300 | 1.22 | 91 | ≦0.001 | ≦0.001 |
| Example 2 | 8800 | 1.37 | 94 | — | — |

[1]Isopropenyl group: —CH$_2$C(CH$_3$)=CH$_2$
[2]The sample was wet-decomposed, and then determined by ICP emission spectroscopic analysis.
[3]The sample was dry-decomposed, and then determined by atomic absorption spectroscopy.

The results set forth in Table 1 show that the isobutylene polymers obtained in Examples 1 and 2 contain little or no Ti or Na. Thus, it is clear that high purity polymers containing little or no impurities were obtained. Table 1 also shows that the processes of Examples 1 and 2 are processes for the effective preparation of an isopropenyl-terminated isobutylene polymer.

[Preliminary Examination 1]

Measurement of water absorption of metal oxide

Titanium oxide (1.00 g) (available from Wako Pure Chemicals Co., Ltd.) was weighed in a ground glass Erlenmeyer flask which had been thoroughly dried. Then, 91.6 g (100 ml) of a 5/6 (by volume) mixture of methylene chloride and n-hexane and a predetermined amount of water were added, and the reaction mixture was then stirred at room temperature for 1 hour. The resulting slurry was then filtered through a No. 4 Kiriyama filter paper with suction. Free water in the filtrate was then measured by the Karl Fischer moisture meter.

The water content in the air, the water content which had previously been adsorbed by titanium oxide and the water content in the mixed solvent were determined by blank test. The water content in the filtrate was then determined by subtracting these water contents from measured value. The results are shown in Table 2. It was found that when the weight of the water content adsorbed by titanium oxide is up to 1.5 times greater than that of titanium oxide, the filtrate is not separated into two phases.

[Preparation Example 1]

Preparation of polymer solution (1)

A pressure-resistant vessel equipped with a mechanical stirrer was thoroughly dried, and the air in the vessel was thoroughly replaced by nitrogen. Into the vessel were then charged 112 ml of methylene chloride which had been previously dehydrated through molecular sieves 3A, 173 ml of n-hexane, 0.289 g of p-DCC and 0.047 g of α-picoline. The vessel was then cooled to a temperature of −70° C., 28 ml of an isobutylene monomer was then transferred to the vessel. Then, 6.83 g (36 mmol) of titanium tetrachloride was added through a dried syringe while nitrogen was being introduced at a small rate through a three-way cock so as to initiate polymerization. The polymerization system was stirred at the same temperature for 1 hour. To the polymerization system was then added 9.96 g of 1,9-decadiene. The polymerization system was further stirred for 4 hours to introduce a carbon-carbon double bond into the ends of the polyisobutylene. The polymer solution obtained in the present Preparation Example will be hereinafter referred to as "polymer solution 1".

EXAMPLE 3

Into an eggplant-type flask was charged 32.4 ml (159 mmol) of a 4.90N methanol solution of sodium methoxide. The polymer solution 1 at a temperature of −70° C. was then slowly poured into the polymerization system. The polymerization system was then stirred until the temperature of the content was returned to room temperature, i.e., for 30 minutes. The flask was then dipped in a 100° C. oil bath, the solvent was then evaporated under reduced pressure. After 15 minutes, the flask was removed the evaporator. The content of the flask was then washed with 50 ml of n-hexane twice to dissolve the polymer therein. The slurry containing a polymer solution was then filtered through a No. 4 Kiriyama filter paper with suction. The resulting transparent filtrate was heated over a 130° C. oil bath under reduced pressure for 1 hour to isolate 18.8 g of a polymer.

The GPC and NMR analysis of the polyisobutylene obtained are shown in Table 3. The results of atomic absorption spectroscopy of sodium and ICP analysis of titanium in the polymer are also shown in Table 3.

EXAMPLE 4

Into a flask were charged 11.78 g (159 mmol) of calcium hydroxide and 3.0 g of water. The polymer solution at a temperature of −70° C. was then poured into the polymerization system. The polymerization system was then stirred at room temperature for 3 hours. The resulting slurry content was then filtered through a No. 4 filter paper with suction. To the resulting filtrate was then added 1 g of aluminum silicate. The mixture was then stirred at room temperature for 3 hours, and then filtered through a No. 4 Kiriyama filter paper with suction. The filtrate was then subjected to evaporation under reduced pressure in the same manner as in Example 3 to isolate a polymer. The polymer thus obtained will be hereinafter referred to as "polymer 2".

The results of GPC and NMR analysis of the polymer 2 are shown in Table 4 with the results of determination of sodium and titanium in the polymer 2.

EXAMPLE 5

In the same manner as in Example 4 except that 8.59 g of a sodium methoxide powder was used instead of calcium hydroxide, a polymer was isolated. The results are shown in Table 4.

EXAMPLE 6

In the same manner as in Example 4 except that 13.36 g of a sodium hydrogencarbonate powder was used instead of calcium hydroxide, a polymer was isolated. The results are shown in Table 4.

COMPARATIVE EXAMPLE 1

The polymer solution 1 at a temperature of −70° C. was poured into 300 ml of water to inactivate a catalyst. The aqueous phase was then removed by decantation, and the remaining organic phase was then repeatedly washed with 300 ml of ion-exchanged water until the electrical conductance of the waste water reached constant. For this purpose, washing was needed three times. As a result, 1,200 ml of waste water containing methylene chloride and n-hexane in a saturated concentration was generated.

The waste water was then subjected to evaporation under reduced pressure in the same manner as in Example 3 to isolate a polymer. The results of analysis of the polymer are shown in Table 5.

COMPARATIVE EXAMPLE 2

The polymer solution 1 was heated in a 45° C. bath to evaporate methylene chloride. The generation of hydrogen chloride was recognized during heating. Thus, serious corrosion occurred in the gas phase area of a metallic vessel (material: SUS316L). When the distillation was stopped, the content of the vessel was poured into 300 ml of water, and washing with water was repeated three times.

The material was then subjected to evaporation under reduced pressure in the same manner as in Example 3 to isolate a polymer. The results of analysis are shown in Table 6.

TABLE 2

| Water absorption of metal oxide | | | | |
|---|---|---|---|---|
| Titanium oxide (mg) | Amount of water added (mg) | Water/titanium oxide ratio (mol/mol) | Water content in filtrate (ppm) | Filtrate Condition |
| 984.1 | 505.9 | 2.28 | 225 | — |
| 994.0 | 756.0 | 3.38 | 226 | — |

TABLE 2-continued

Water absorption of metal oxide

| Titanium oxide (mg) | Amount of water added (mg) | Water/titanium oxide ratio (mol/mol) | Water content in filtrate (ppm) | Filtrate Condition |
|---|---|---|---|---|
| 994.0 | 1006.0 | 4.49 | 244 | − |
| 994.0 | 1506.0 | 6.72 | 214 | − |
| 991.5 | 2008.5 | 8.99 | 355 | + |
| 991.5 | 2508.5 | 11.23 | 435 | + |
| 1051.0 | 3009.0 | 12.71 | 441 | + |
| 1011.3 | 4008.7 | 17.59 | 448 | + |
| 994.0 | 5006.0 | 22.35 | 415 | + |
| 1001.4 | 7008.6 | 31.07 | 451 | + |

Note)
−: The filtrate was uniform.
+: The filtrate was separated into two phases: aqueous phase and organic phase.

TABLE 3

| Mn | Mw/Mn | Fn(v) | Sodium i | Titanium |
|---|---|---|---|---|
| 16,200 | 1.13 | 1.90 | ND** | ND** |

*In the table, Mn and Mw/Mn are number-average molecular weight and molecular weight distribution, respectively, determined by GPC as standard polystyrene-based values. Fn(v) represents the number of vinyl groups per molecule totally determined by from the results of GPC and NMR.
**ND hereinafter indicates that the content of sodium and titanium falls below the minimum determinable level, i.e., 10 ppm.

TABLE 4

| Solid base | Mn | Mw/Mn | Fn (v) | Sodium | Titanium |
|---|---|---|---|---|---|
| Ca(OH)$_2$ | 16,900 | 1.16 | 1.80 | ND | ND |
| NaOCH$_3$ | 16,800 | 1.16 | 1.83 | ND | ND |
| NaHCO$_3$ | 16,300 | 1.17 | 1.44 | ND | ND |

TABLE 5

Experiment on inactivation by water

| Mn | Mw/Mn | Fn (v) | Sodium | Titanium |
|---|---|---|---|---|
| 16,500 | 1.15 | 1.82 | ND | ND |

TABLE 6

Experiment on removal or halogenated hydrocarbon before inactivation of catalyst

| Mn | Mw/Mn | Fn (v) | Sodium | Titanium |
|---|---|---|---|---|
| 9,500 | 3.49 | 0.92 | ND | ND |

[Preliminary examination 2]
Experiment on selection of adsorbent

A stirrer tip and a predetermined amount of an adsorbent were put into an Erlenmeyer flask. The air in the flask was then replaced by nitrogen. Methylene chloride (100 ml) was then charged into the flask so that the adsorbent was distilled therein. Titanium tetrachloride was then charged into the flask through a dried syringe, and the mixture was then stirred at room temperature for 1 hour. The solution (30 ml) was collected and then transferred to a separating funnel. The solution was then washed with the same volume of ion-exchanged water three times. The three batches of wash water used were then put together. Ion-exchanged water was then added to the wash water to make 1,000 ml. The wash water was then measured for pH by means of a pH meter which had been previously corrected. The results are as shown in Table 7. It was found that activated carbon and aluminum silicate are highly capable of adsorbing an acid.

TABLE 7

Experiment on selection of adsorbent

| Adsorbent | Amount of adsorbent (g) | Amount of titanium tetrachloride (g) | pH of wash water |
|---|---|---|---|
| None | 0 | 1.155 | 1.97 |
| Activated carbon | 31.2 | 0.980 | 4.60 |
| Alumina oxide | 36.0 | 1.533 | 1.88 |
| Celite | 17.9 | 1.390 | 1.81 |
| Molecular sieves 3A | 20.1 | 0.803 | 1.98 |
| Aluminum silicate | 7.0 | 0.921 | 3.82 |

[Preparation example 2]
Preparation of polymer solution (2)

A 500 ml-capacity pressure-resistant vessel equipped with a mechanical stirrer was thoroughly dried, and the air in the vessel was then thoroughly replaced by nitrogen. Into the vessel were then charged 187 ml of methylene chloride which had been previously dehydrated with molecular sieves 3A, 125 ml of n-hexane, 0.578 g of p-DCC and 0.047 g of α-picoline. The vessel was then cooled to a temperature of −50° C. isobutylene monomer (28 ml) which had been measured out in a separate vessel was then transferred to the vessel. Titanium tetrachloride (2.37 g) was charged into the vessel through a dried syringe while nitrogen gas was being introduced thereinto at a small rate through a three-way cock so as to initiate polymerization. Stirring was continued under the same conditions for 2 hours to complete the reaction, and thus a polymer solution was obtained. The polymer solution obtained in the present preparation example will be hereinafter referred to as "polymer solution 2".

EXAMPLE 7

Three dried flasks equipped with a nitrogen line, a stirrer tip and a rectification column were prepared. The polymer solution 2 which had been kept at a temperature of −50° C. was then charged into these flasks in an amount of 40 g for each. Subsequently, activated carbon (available from Wako Pure Chemicals Co., Ltd.; finely divided powder) in an amount of 0.1 g, 0.5 g and 2.6 g, respectively, was then added into these flasks. The mixture was then stirred under the same conditions for 1 hour.

The flask was then dipped in a 45° C. oil bath so that methylene chloride was evaporated by rectification. The solid content was then removed by filtration with suction, and the content was then transferred to a separating funnel. The resulting organic phase was then washed with 20 ml of ion-exchanged water three times. The organic phase was then subjected to evaporation at a temperature of 120° C. under reduced pressure for 1 hour to obtain an isobutylene polymer. The GPC and NMR analysis data of the isobutylene polymer were as shown in Table 8 in which Fn indicates the number of functional groups per molecule. Table 8 also shows the results of analysis of the wash water.

TABLE 8

Experiment with activated carbon as adsorbent

| Amount of activated carbon (g) | Mn | Mw/Mn | Fn (iso) | Fn (inn) | DCM |
|---|---|---|---|---|---|
| 2.6 | 8,100 | 1.24 | 0.11 | 0 | ND |
| 0.5 | 9,100 | 1.20 | 0.19 | 0.11 | ND |
| 0.1 | 7,700 | 1.43 | 0.15 | 0 | ND |

*In the table, Mn and Mw/Mn indicate number-average molecular weight and molecular weight distribution, respectively, determined by GPC. Fn (iso) and Fn (inn) indicate the number of isopropenyl groups and 2-methyl-1-propenyl groups per molecule, respectively. DCM indicates the content of methylene chloride in the wash water.

EXAMPLE 8

Experiments were conducted in the same manner as in Example 7 except that aluminum silicate was used in an amount of 0.1 g, 0.5 g and 2.6 g, respectively, instead of activated carbon to obtain isobutylene polymers. The results are shown in Table 9.

TABLE 9

Experiment with aluminum silicate as adsorbent

| Amount of aluminum silicate (g) | Mn | Mw/Mn | Fn (iso) | Fn (inn) | DCM |
|---|---|---|---|---|---|
| 2.6 | 9,500 | 1.22 | 0 | 0 | ND |
| 0.5 | 9,400 | 1.20 | 0.09 | 0 | ND |
| 0.1 | 8,600 | 1.22 | 0.49 | 0.10 | ND |

COMPARATIVE EXAMPLE 3

In the same manner as in Example 7 except that no adsorbents were used, an isobutylene polymer was obtained. The results are shown in Table 10.

TABLE 10

Comparative experiment free of adsorbent (1)

| Amount of adsorbent (g) | Mn | Mw/Mn | Fn (iso) | Fn (inn) | DCM |
|---|---|---|---|---|---|
| 0 | 7,100 | 1.61 | 0.61 | 0.94 | ND |

COMPARATIVE EXAMPLE 4

The polymer solution 2 (40 g) was poured into 100 g of methanol cooled with ice with vigorous stirring, and the solvent was removed by decantation. The resulting white precipitate was then re-dissolved in 30 ml of n-hexane. The resulting organic phase was washed with ion-exchanged water three times. The material was then treated in the same manner as in Example 7 to obtain an isobutylene polymer. The results are shown in Table 11.

TABLE 11

Comparative experiment free of adsorbent (2)

| Mn | Mw/Mn | Fn (iso) | Fn (inn) |
|---|---|---|---|
| 8,700 | 1.29 | 0 | 0 |

The cold methanol reprecipitation method shown in Table 11 can produce a sample with least side reactions in laboratory isolation methods, but produces a mixed solvent which is difficult to purify. It has been found that such a polymer has a tertiary carbon-chlorine bond at the ends thereof. Therefore, the fact that Fn (iso) and Fn (inn) in Table 11 are each 0 indicates that no isomerization occurs at the ends of the polymer. In the method free of adsorbent shown in Table 10, the molecular weight distribution is increased with the progress of isomerization at the ends of the polymer, demonstrating that undesirable side reactions occur. The comparison between Tables 8 and 9 shows that as the content of the adsorbent decreases, the results is close to that of the case using no adsorbent. Since methylene chloride had been removed before washing with water in Tables 8 and 9, methylene chloride could not be detected in the wash water.

[Industrial applicability]

As compared with the prior art, the process of the present invention has the following advantages:

1. Even if a halide such as methylene chloride is used as a solvent for the polymerization of isobutylene monomer, no waste water having such a halide dissolved therein is generated.

2. The washing step can be omitted from the standpoint of process mechanism.

3. The dehydrochlorination reaction at the ends of the polymer at the same time with the ligand exchange reaction makes it possible to easily obtain a telechelic isobutylene polymer having unsaturated groups without isolating a telechelic polymer terminated by chlorine group as an intermediate.

4. The dehydrochlorination reaction at the ends of the polymer under reduced pressure makes it possible to accelerate the polymerization reaction.

We claim:

1. A process for the isolation of an isobutylene polymer which includes a cationic polymerization reaction in a non-aqueous system in the presence of a catalyst represented by the following formula (I):

$$MX_n \qquad (I)$$

wherein M represents a metallic atom; n represents an integer of from 2 to 6; and the plurality of X may be the same or different and each represent a halogen atom or a monovalent hydrocarbon group, the process comprising conducting the cationic polymerization reaction with a cationically polymerizable monomer containing isobutylene, conducting a ligand exchange reaction of said catalyst, and then removing a component containing M of the formula (I).

2. The process for the isolation of an isobutylene polymer according to claim 1, wherein said ligand exchange reaction is effected with the addition of a compound represented by the following formula (II):

$$Q(OR)_m \qquad (II)$$

wherein Q represents a metallic atom belonging to the group $I_a$, $II_a$ $III_a$, $III_b$, $IV_a$ or $IV_b$ of the periodic table; m represents an integer of from 1 to 6; and R represents a hydrogen atom or a monovalent organic group, with the proviso that when m is 2 or more, the plurality of R may be the same or different, and simultaneously producing a telechelic isobutylene polymer.

3. A process for the isolation of an isobutylene polymer which comprises the cationic polymerization of a cationically polymerizable monomer containing isobutylene in a non-aqueous system in the presence of a catalyst represented by the following formula (I):

MX$_n$                   (I)

wherein M represents a metallic atom; n represents an integer of from 2 to 6; and the plurality of X may be the same or different and each represent a halogen atom or a monovalent hydrocarbon group, the process comprising producing a telechelic isobutylene polymer and simultaneously removing said catalyst with an adsorption material capable of adsorbing an acid.

4. A process for the isolation of an isobutylene polymer, which comprises carrying out cationic polymerization reaction of a cationically polymerizable monomer containing isobutylene in a non-aqueous system in the presence of a catalyst represented by the following formula (I):

MX$_n$                   (I)

wherein M represents a metallic atom; n represents an integer of from 2 to 6; and the plurality of X may be the same or different and each represent a halogen atom or a monovalent hydrocarbon group, adding a compound represented by the formula (II):

O(OR)$_m$                (II)

wherein O represents a metallic atom belonging to the group I$_a$, II$_a$, III$_a$, III$_b$, IV$_a$ or IV$_b$ of the periodic table; m represents an integer of from 1 to 6: and R represents a hydrogen atom or a monovalent organic group, with the proviso that when m is 2 or more, the plurality of R may be the same or different, to accomplish a dehydrohalogenation reaction at the ends of the polymer and a ligand exchange reaction of the catalyst so as to produce a telechelic isobutylene polymer having an unsaturated group; and removing a component containing M of the formula (I).

5. The process for the isolation of an isobutylene polymer according to claim 2, wherein said compound represented by the formula (II) comprises at least one compound or a plurality of compounds selected from the group consisting of NaOH, KOH, LiOH, Ca(OH)$_2$, NaHCO$_3$, NaOCH$_3$, KOCH$_3$ LiOCH$_3$, Ca(OCH$_3$)$_2$, Mg(OCH$_3$)$_2$, Al(OCH$_3$)$_3$, Ti(OCH$_3$)$_4$, NaOCH$_2$CH$_3$, KOCH$_2$CH$_3$, LiOCH$_2$CH$_3$, Ca(OCH$_2$CH$_3$)$_2$, Mg(OCH$_2$CH$_3$)$_2$, Al(OCH$_2$CH$_3$)$_3$, Ti(OCH$_2$CH$_3$)$_4$, NaOC(CH$_3$)$_3$, KOC(CH$_3$)$_3$, LiOC(CH$_3$)$_3$, NaOC(CH$_3$)$_2$CH$_2$CH$_3$, and Al[OCH(CH$_3$)$_2$]$_3$.

6. The process for the isolation of an isobutylene polymer according to claim 4, wherein said dehydrohalogenation at the ends of the polymer is effected under reduced pressure of not higher than 700 mmHg.

7. The process for the isolation of an isobutylene polymer according to claim 1, wherein the following components (1) to (5) are mixed at a temperature of from −100° C. to 0° C. to prepare an isobutylene polymer:

(1) a cationically polymerizable monomer having isobutylene;

(2) a compound represented by the following formula (III):

                (III)

wherein R$^1$ represents an aromatic ring group or substituted or unsubstituted aliphatic hydrocarbon group; R$_2$ and R$_3$ may be the same or different and each represent a hydrogen atom or substituted or unsubstituted monovalent hydrocarbon group, with the proviso that when R$^1$ is an aliphatic hydrocarbon group, at least one of R$^2$ and R$^3$ is not a hydrogen atom; X represents a halogen atom, R$^4$COO-group (in which R$^4$ represents a hydrogen atom or a C$_{1-5}$ alkyl group); or R$^5$O group (in which R$^5$ represents a hydrogen atom or a C$_{1-15}$ alkyl group); and w represents an integer of from 1 to 8;

(3) said catalyst;

(4) an electron donor component having a donor number of from 15 to 50; and (5) a reaction solvent.

8. The process for the isolation of an isobutylene polymer according to claim 4, wherein said compound represented by the formula (II) comprises at least one compound or a plurality of compounds selected from the group consisting of NaOH, KOH, LiOH, Ca(OH)$_2$, NaHCO$_3$, NaOCH$_3$, KOCH$_3$ LiOCH$_3$, Ca(OCH$_3$)$_2$, Mg(OCH$_3$)$_2$, Al(OCH$_3$)$_3$, Ti(OCH$_3$)$_4$, NaOCH$_2$CH$_3$, KOCH$_2$CH$_3$, LiOCH$_2$CH$_3$, Ca(OCH$_2$CH$_3$)$_2$, Mg(OCH2CH$_3$)$_2$, Al(OCH$_2$CH$_3$)$_3$, Ti(OCH$_2$CH$_3$)$_4$, NaOC(CH$_3$)$_3$, KOC(CH$_3$)$_3$, LiOC(CH$_3$)$_3$, NaOC(CH$_3$)$_2$CH$_2$CH$_3$, and Al[OCH(CH$_3$)$_2$]$_3$.

9. The process for the isolation of an isobutylene polymer according to claim 4, wherein said dehydrohalogenation at the ends of the polymer is effected under reduced pressure of not higher than 700 mmHg.

10. The process for the isolation of an isobutylene polymer according to claim 3, wherein the following components (1) to (5) are mixed at a temperature of from −100° C. to 0° C. to prepare an isobutylene polymer:

(1) a cationically polymerizable monomer having isobutylene;

(2) a compound represented by the following formula (III):

                  (III)

wherein R$^1$ represents an aromatic ring group or substituted or unsubstituted aliphatic hydrocarbon group; R$_2$ and R$_3$ may be the same or different and each represent a hydrogen atom or substituted or unsubstituted monovalent hydrocarbon group, with the proviso that when R$^1$ is an aliphatic hydrocarbon group, at least one of R$^2$ and R$^3$ is not a hydrogen atom; X represents a halogen atom, R$^4$COO-group (in which R$^4$ represents a hydrogen atom or a C$_{1-5}$ alkyl group); or R$^5$O group (in which R$^5$ represents a hydrogen atom or a C$_{1-15}$ alkyl group); and w represents an integer of from 1 to 8;

(3) said catalyst;

(4) an electron donor component having a donor number of from 15 to 50; and (5) a reaction solvent.

11. The process for the isolation of an isobutylene polymer according to claim 5, wherein the following components (1) to (5) are mixed at a temperature of from −100° C. to 0° C. to prepare an isobutylene polymer:

(1) a cationically polymerizable monomer having isobutylene;

(2) a compound represented by the following formula (III):

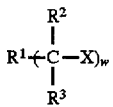

wherein $R^1$ represents an aromatic ring group or substituted or unsubstituted aliphatic hydrocarbon group; $R_2$ and $R_3$ may be the same or different and each represent a hydrogen atom or substituted or unsubstituted monovalent hydrocarbon group, with the proviso that when $R^1$ is an aliphatic hydrocarbon group, at least one of $R^2$ and $R^3$ is not a hydrogen atom; X represents a halogen atom, $R^4$COO-group (in which $R^4$ represents a hydrogen atom or a $C_{1-5}$ alkyl group); or $R^5$O group (in which $R^5$ represents a hydrogen atom or a $C_{1-15}$ alkyl group); and w represents an integer of from 1 to 8;

(3) said catalyst;

(4) an electron donor component having a donor number of from 15 to 50; and (5) a reaction solvent.

12. The process for the isolation of an isobutylene polymer according to claim 6, wherein the following components (1) to (5) are mixed at a temperature of from $-100°$ C. to $0°$ C. to prepare an isobutylene polymer:

(1) a cationically polymerizable monomer having isobutylene;

(2) a compound represented by the following formula (III):

wherein $R^1$ represents an aromatic ring group or substituted or unsubstituted aliphatic hydrocarbon group; $R_2$ and $R_3$ may be the same or different and each represent a hydrogen atom or substituted or unsubstituted monovalent hydrocarbon group, with the proviso that when $R^1$ is an aliphatic hydrocarbon group, at least one of $R^2$ and $R^3$ is not a hydrogen atom; X represents a halogen atom, $R^4$COO-group (in which $R^4$ represents a hydrogen atom or a $C_{1-5}$ alkyl group); or $R^5$O group (in which $R^5$ represents a hydrogen atom or a $C_{1-5}$ alkyl group); and w represents an integer of from 1 to 8;

(3) said catalyst;

(4) an electron donor component having a donor number of from 15 to 50; and (5) a reaction solvent.

* * * * *